United States Patent
Baptist et al.

(10) Patent No.: US 10,628,399 B2
(45) Date of Patent: Apr. 21, 2020

(54) STORING DATA IN A DISPERSED STORAGE NETWORK WITH CONSISTENCY

(71) Applicant: International Business Machines Corporation, Armonk, NY (US)

(72) Inventors: Andrew D. Baptist, Mt. Pleasant, WI (US); Adam M. Gray, Chicago, IL (US); Scott M. Horan, Clarendon Hills, IL (US); Wesley B. Leggette, Chicago, IL (US); Jason K. Resch, Chicago, IL (US); Ilya Volvovski, Chicago, IL (US); Ethan S. Wozniak, Park Ridge, IL (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/142,297

(22) Filed: Apr. 29, 2016

(65) Prior Publication Data
US 2017/0316037 A1 Nov. 2, 2017

(51) Int. Cl.
*G06F 16/00* (2019.01)
*G06F 16/21* (2019.01)
(Continued)

(52) U.S. Cl.
CPC ........ *G06F 16/219* (2019.01); *G06F 11/1076* (2013.01); *G06F 16/183* (2019.01); *G06F 16/2474* (2019.01); *H04L 67/1097* (2013.01)

(58) Field of Classification Search
CPC ..................................................... G06F 17/30
See application file for complete search history.

(56) References Cited

U.S. PATENT DOCUMENTS 4,092,732 A 5/1978 Ouchi
5,454,101 A 9/1995 Mackay et al.
(Continued)

FOREIGN PATENT DOCUMENTS

CN 103067471 A 4/2013

OTHER PUBLICATIONS

International Searching Authority; International Search Report and Written Opinion; International Application No. PCT/IB2017/050949; Jun. 15, 2017; 13 pgs.
(Continued)

*Primary Examiner* — Khanh B Pham
(74) *Attorney, Agent, or Firm* — James Nock; Andrew D. Wright; Roberts Mlotkowski Safran Cole & Calderon, P.C.

(57) ABSTRACT

A method includes, for a write operation regarding a set of encoded data slices, determining, by a computing device, whether the write operation is a first instance of writing the set. The method further includes, when the write operation is a first instance, sending, by the computing device, a set of write requests to the storage units, wherein the write requests includes the set of encoded data slices, slice names, and an indication of the first instance. The method further includes, in response to a write request of the set of write requests, determining, by a storage unit, whether a previous version of an encoded data slice is currently stored. The method further includes, when the previous version is currently stored sending, by the storage unit, a conflict message to the computing device. The method further includes updating, by the computing device, the write requests based on the conflict message.

25 Claims, 7 Drawing Sheets

(51) Int. Cl.
    *G06F 16/2458*   (2019.01)
    *G06F 16/182*    (2019.01)
    *G06F 11/10*     (2006.01)
    *H04L 29/08*     (2006.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,549,351 | B2 | 10/2013 | Dhuse |
| 8,572,429 | B2 | 10/2013 | Dhuse |
| 8,595,435 | B2 | 11/2013 | Cilfone et al. |
| 9,092,386 | B2 | 7/2015 | Baptist et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0071988 | A1* | 3/2011 | Resch ............... G06F 11/1076 707/691 |
| 2013/0283094 | A1* | 10/2013 | Baptist ............... H04L 67/1097 714/6.2 |
| 2014/0075112 | A1 | 3/2014 | Baptist et al. |
| 2014/0115387 | A1 | 4/2014 | Vas |
| 2014/0122924 | A1 | 5/2014 | Kazi |
| 2014/0156719 | A1 | 6/2014 | Leggette et al. |
| 2014/0207899 | A1 | 7/2014 | Mark |
| 2014/0331086 | A1 | 11/2014 | Resch |
| 2015/0006594 | A1 | 1/2015 | Volvovski |
| 2015/0193309 | A1 | 7/2015 | Khadiwala |
| 2015/0220396 | A1 | 8/2015 | Shirley, Jr. |
| 2015/0317205 | A1 | 11/2015 | Gray et al. |
| 2015/0319244 | A1 | 11/2015 | Resch |
| 2015/0378822 | A1 | 12/2015 | Grube |
| 2016/0147453 | A1 | 5/2016 | Baptist |
| 2016/0255150 | A1 | 9/2016 | Dhuse |

OTHER PUBLICATIONS

Apr. 29, 2016, U.S. Appl. No. 15/142,297.
May 27, 2016, U.S. Appl. No. 15/166,854.
List of IBM Patents or Applications treated as Related. (previously submitted as Document Description Information Disclosure Statement (IDS) Form SB08 on Aug. 1, 2016).
Shamir; How to Share a Secret; Communications of the ACM; vol. 22, No. 11; Nov. 1979; pp. 612-613.
Rabin; Efficient Dispersal of Information for Security, Load Balancing, and Fault Tolerance; Journal of the Association for Computer Machinery; vol. 36, No. 2; Apr. 1989; pp. 335-348.
Chung; An Automatic Data Segmentation Method for 3D Measured Data Points; National Taiwan University; pp. 1-8; 1998.
Plank, T1: Erasure Codes for Storage Applications; FAST2005, 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs.
Legg; Lightweight Directory Access Protocol (LDAP): Syntaxes and Matching Rules; IETF Network Working Group; RFC 4517; Jun. 2006; pp. 1-50.
Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
List of IBM Patents or Applications Treated as Related, Apr. 25, 2018, 2 pages.
Examination Report; GB Application No. GB1818999.3; dated Jan. 17, 2019; 5 pages.

\* cited by examiner

FIG. 1
distributed computing system 10

STORING DATA IN A DISPERSED STORAGE NETWORK WITH CONSISTENCY

BACKGROUND OF THE INVENTION

Technical Field of the Invention

Aspects of this invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

Distributed storage systems are known to utilize a three-phase process for writing consistently in a dispersed storage network (DSN) memory, where the three phases includes:
1. A write phase;
2. A make available phase; and
3. A finalize phase.

The three phases address consistency issues that may arise from different storage units of the DSN holding different revisions of encoded data slices, where data is dispersed storage error encoded to produce the encoded data slices. The three phases are known to utilize a threshold approach to advance the writing process to the next phase or to reverse the process when conflicts and errors arise to maintain consistency of revision storage.

DETAILED DESCRIPTION OF THE INVENTION

Figure 1:
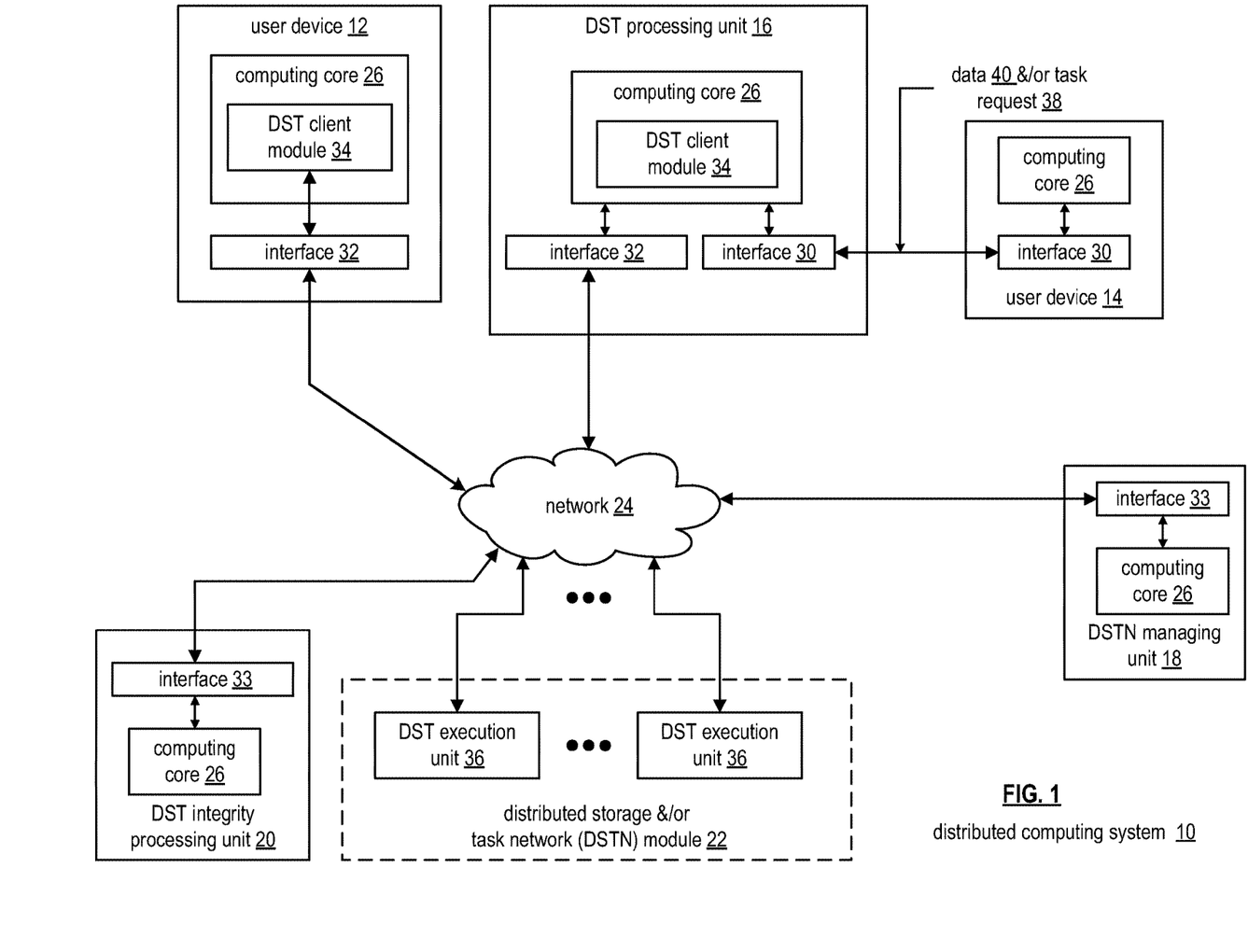
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more non-public intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to unauthorized attempts at accessing the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
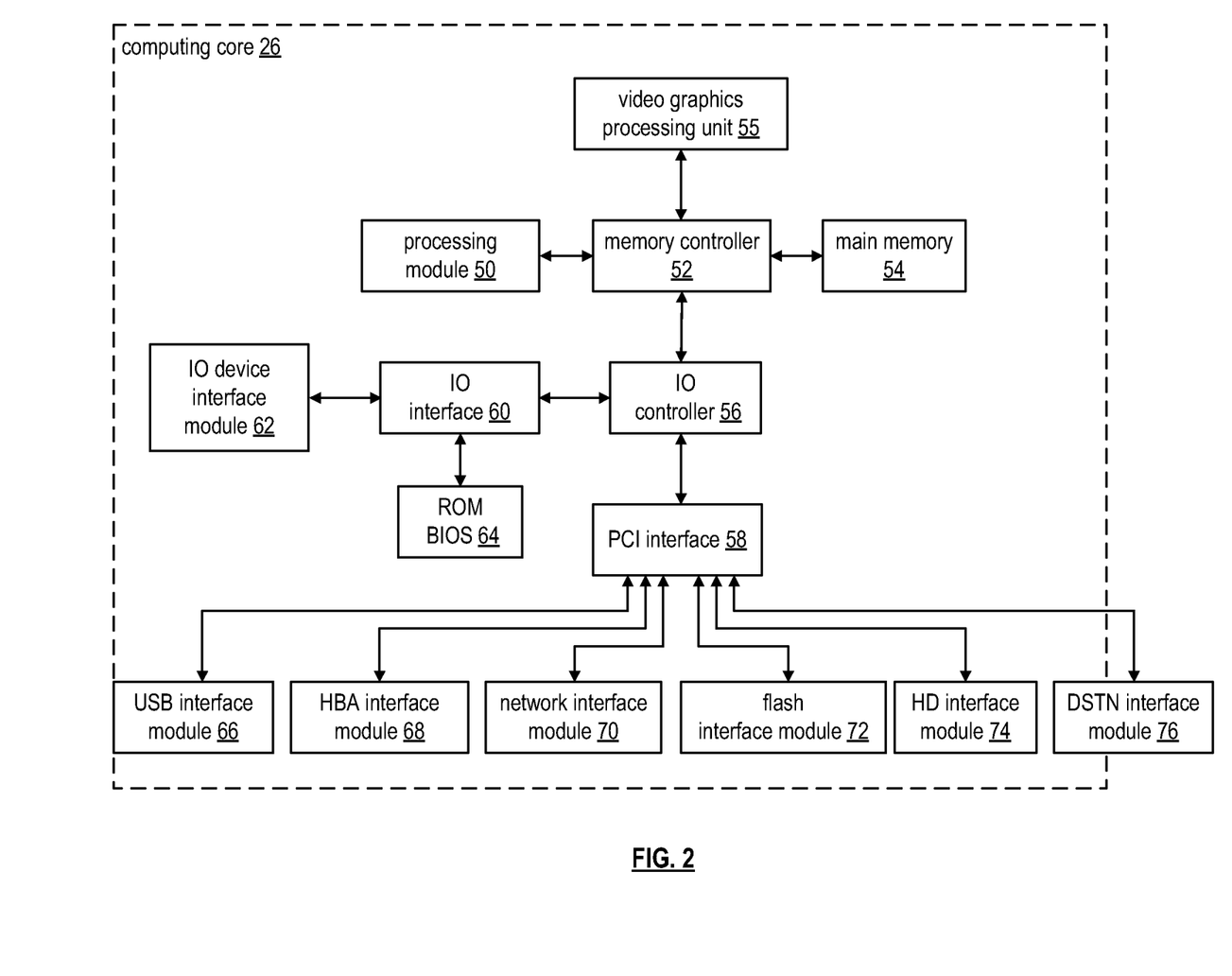
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1.

Further note that the 10 device interface module 62 and/or the memory interface modules may be collectively or individually referred to as 10 ports.

Figure 3:
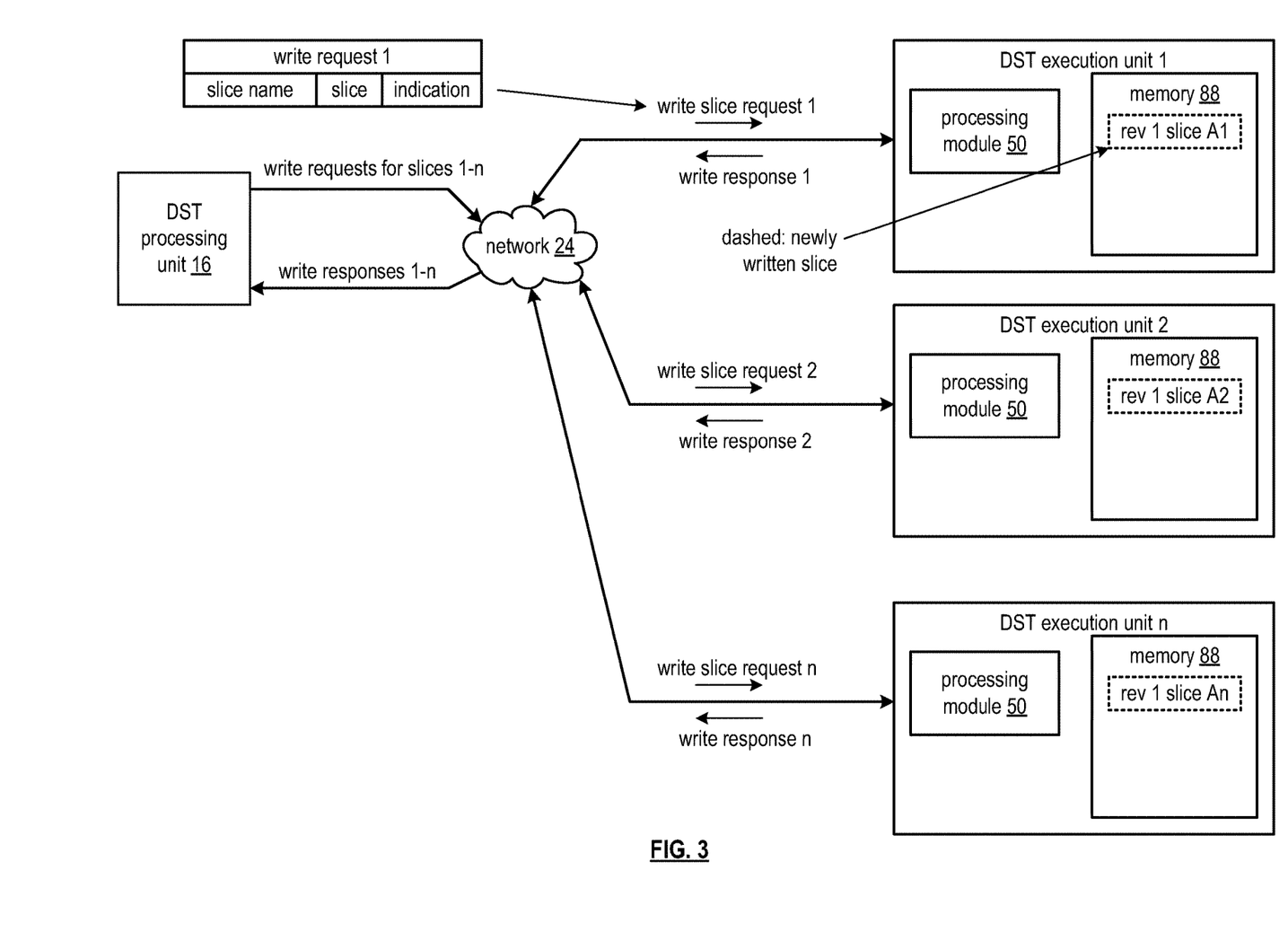
FIGS. 3-5 are schematic block diagrams of an embodiment of a dispersed storage network (DSN) in accordance with the present invention.
Figure 4:
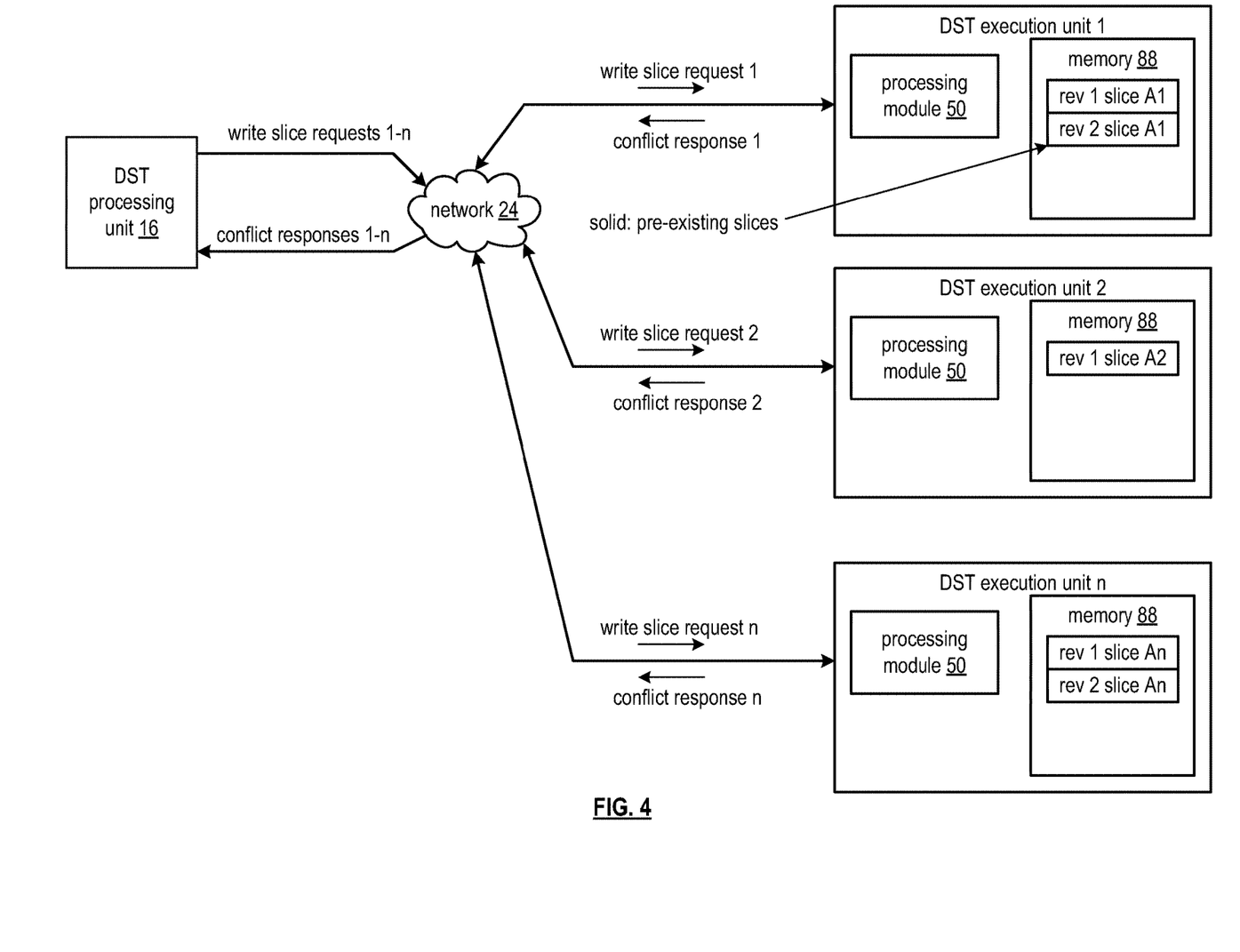
Figure 5:
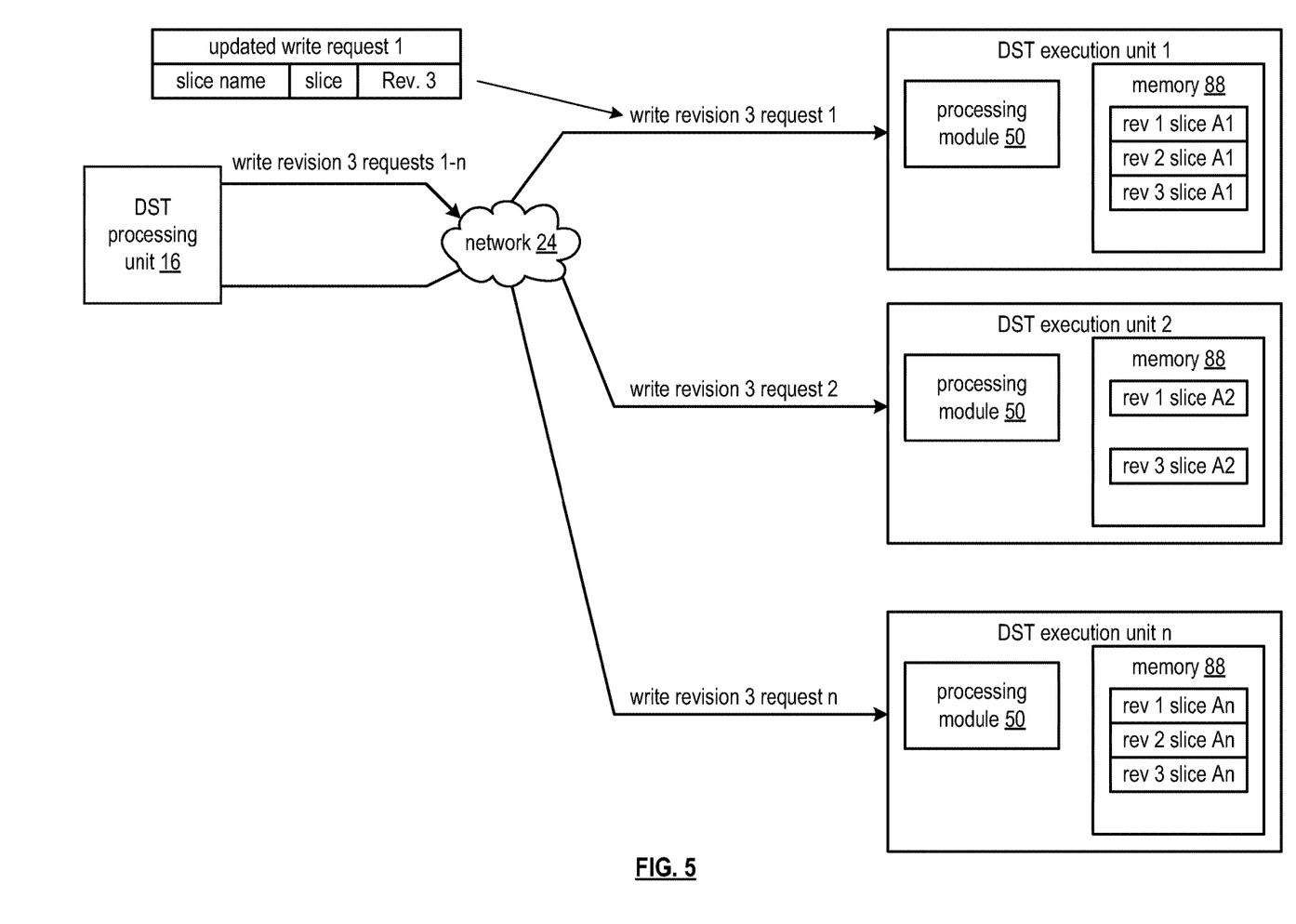

FIGS. 3-5 are schematic block diagrams of an embodiment of a dispersed storage network (DSN) that includes the distributed storage and task (DST) processing unit 16 of FIG. 1, the network 24 of FIG. 1, and a set of DST execution units 1-$n$. Each DST execution unit includes the processing module 50 of FIG. 2 and a memory 88. The memory 88 may be implemented utilizing one or more of solid-state memory, magnetic disk drive memory, optical disk drive memory, etc. Hereafter, the set of DST execution units may be interchangeably referred to as a set of storage units.

Within the DSN, the DST processing unit 16 dispersed storage error encodes a data segment of a data object to produce at set of encoded data slices for storage in the set of DST execution units 1-$n$. Over time, the data segment of the data object may be edited or otherwise modified and, for each edit or modification, the DST processing unit dispersed storage error encoded the data segment to create a set of encoded data slices. For each version (e.g., the original or subsequent edits and/or modifications) of the set of encoded data slices, they will share a similar set of slices names, with each version having a different revision level (e.g., revision level 0 for the initial version, revision level 1 for the first edit, etc.).

In the DSN, multiple user devices may be trying to edit/modify the set of encoded data slices at substantially the same time. In an existing DSN, to maintain concurrency of writing data to the storage units, a write operation uses a three-phase process. When a user device has a desire to write a set of encoded data slices, whether an original set or a modified/edited set, the user sends a set of write requests to the storage units. A write request includes one of the encoded data slices and its corresponding slice name. Upon receiving the write request, the storage unit determines whether there is another write request in process for the slice name (e.g., another write request regarding the encoded data slice from a different user device). For instance, when a three-phase write operation is pending, after receipt of the write request and verification that another write request is not pending, the storage unit locks access to the encoded data slice until the write operation is completed. If access to the encoded data slice is not locked, the storage unit locks it for the current write operation, temporarily stores the encoded data slice but does not allow access to it, and sends a write response message indicating that the storage unit is able to process the user's write request.

If the user device gets a write threshold number of favorable write responses from the storage units, it sends make available requests to the storage units. Upon receiving the make available request, a storage unit makes the encoded data slice available for access and sends a write available response to the user device.

When the user device receives a write threshold number of favorable write available responses for the storage unit, it sends write finalize requests to the storage units. Upon receiving the write finalize request, a storage unit updates the status of the newly stored encoded data slice as the most current version of the encoded data slice, releases the lock, and may delete an older version of the encoded data slice.

With reference to FIG. 3, when a user device (e.g., a DST processing unit or computing device) has a set of encoded data slices to store in the storage unit, it determines whether this is a first instance of writing the set of encoded data slices. The computing device makes the determination based on one or more of detecting that the write operation is associated with a new virtual storage vault, detecting that a virtual DSN address associated with the data has been recently randomly generated, detecting that the data is substantially new data, detecting that storage vault is substantially empty, interpreting a historical access record that indicates that instances of writing new data far outnumbers instances of overwriting previously stored data, a predetermination, and a pattern associated with performing new write operations.

When the write operation is a first instance of writing, the DST processing unit 16 sends, via the network 24, a set of write requests 1-n to the storage units, where the set of write requests includes the set of encoded data slices, a set of slice names, and an indication of the first instance of the writing of the set of encoded data slices. The indication of the first instance of the writing may be including within each write request a revision level of associated with a first revision (e.g., zero or one). Alternatively, omitting a revision level indication in each write request may indicate the first instance of writing. For example, the DST processing unit 16 generates a set of slice names based on one or more of an attribute of the data (e.g., a data name), an attribute of a requesting entity (e.g., a virtual vault affiliation), and a random generating approach; generates the set of write requests to include the set of slice names, the set of encoded data slices (e.g., A1-An), and an omission of a revision level; and sends, via the network 24, the set of write slice requests to the set of DST execution units 1-n for storage.

In response to a write request, a storage unit determines whether it is storing a previous version of an encoded data slice having the same slice name. For example, the processing module 50 of the DST execution unit 1 indicates that it is not storing a previous version of the encoded data slice when it has no record of storing an encoded data slice with that slice name. As an alternative example, the processing module of DST execution unit 1 (or storage unit 1) indicates that it is storing a previous version of the encoded data slice if it has a record of storing an encoded data slice with that slice name.

When the storage unit does not currently store the previous version of the encoded data slice, the storage unit issues a favorable write response to the DST processing unit 16. The favorable write response indicates that the corresponding write slice request was favorably processed without a conflict due to a previously stored revision of the encoded data slice. In addition, the storage unit makes the encoded data slice available for access.

When the DST processing unit 16 receives the favorable write responses from at least some of the storage units (e.g., a write threshold), the DST processing unit 16 issues a set of write commit requests to the storage units to facilitate subsequent retrieval of at least some of the stored encoded data slices. Upon receiving the write commit requests; the storage units finalize the write operation. In this instance, there are two exchanges between the user device and the storage units as opposed to three exchanges in the three-phase write process.

FIG. 4 illustrates another example of storing data. In this example, the DST processing unit 16 determines whether the write operation for set of encoded data slices is the first instance of writing. When the write operation is the first instance, the DST processing unit 16 sends, via the network 24, a set of write requests to the storage units, where the set of write requests includes the set of encoded data slices, a set of slice names, and an indication of the first instance of the writing of the set of encoded data slices.

In this example, the DST processing unit 16 was wrong; it was not the first instance of writing the set of encoded data slices. As shown, each of the DST execution units 1 is storing a previous version of an encoded data slice. For example, the processing module 50 of the DST execution unit 1 determines that it is storing two previous versions of the encoded data slice (revisions 1 and 2). Similarly, DST execution unit 2 determines that it is storing one previous version and DST execution unit n determines that it is also storing two previous versions.

When this occurs, the DST execution units send conflict responses to the DST processing unit 16 indicating that previous versions of the encoded data slices are already stored. Upon receiving the conflict requests, the DST processing unit 16 determines that the write operation is not the first instance. As such, the DST processing unit 16 issues, via the network, a set of read requests to the storage units regarding the set of encoded data slices. Having issued the set of read requests, the DST processing unit 16 determines a current revision level for the set of encoded data slices based on read responses from at least some of the storage units. For example, the DST processing unit 16 indicates that the current revision level is level 2 when the DST processing unit 16 determines that at least a decode threshold number of encoded data slices of a revision 2 are stored by the set of DST execution units, where received read responses indicate revision levels of stored encoded data slices.

Having determined the current revision level, the DST processing unit 16 sends a new set of write requests to the storage units, where the set of write requests includes the set of encoded data slices, the set of slice names, and a next revision level for the set of encoded data slices. For example, the DST processing unit 16 determines the next revision level as level 3 based on the current revision level of 2 and includes the next revision level of level 3 in the set of write requests. When a write threshold number of the favorable write responses have been received, the DST processing unit 16 sends a set of make available requests to the storage units to enable the set of encoded data slices to be subsequently recovered.

As such, when the writing of a set of encoded data slices is the first instance, the process of FIG. 3 is implementing using the two exchanges. If, it turns out that it is not the first instance, the process of FIG. 4 is implemented using the three exchanges.

FIG. 5 further illustrates the other example of the storing of the data where the DST processing unit 16, when receiving the conflict message, updates the set of write requests based on the conflict message. The updating the set of write requests includes the DST processing unit 16 determining a current revision level for the set of encoded data slices based on the conflict message from one or more of the storage units (e.g., revision 2), updating the set of write requests to include a next revision level for the set of encoded data slices (e.g., revision level 3), and sending the updated set of write requests to the storage units, where the updated set of write requests includes the set of encoded data slices, the set of slice names, and the next revision level for the set of encoded data slices. For example, the DST processing unit 16 sends, via the network 24, the updated set of write requests to the set of DST execution units 1-*n*, where the updated set of write requests includes the revision level 3.

Alternatively, when the write operation is the first instance of writing the set of encoded data slices and the DST processing unit 16 receives favorable write responses from at least some of the storage units, and when a write threshold number of the favorable write responses have been received, the DST processing unit 16 sends a set of write commit requests to the storage units.

Figure 6:
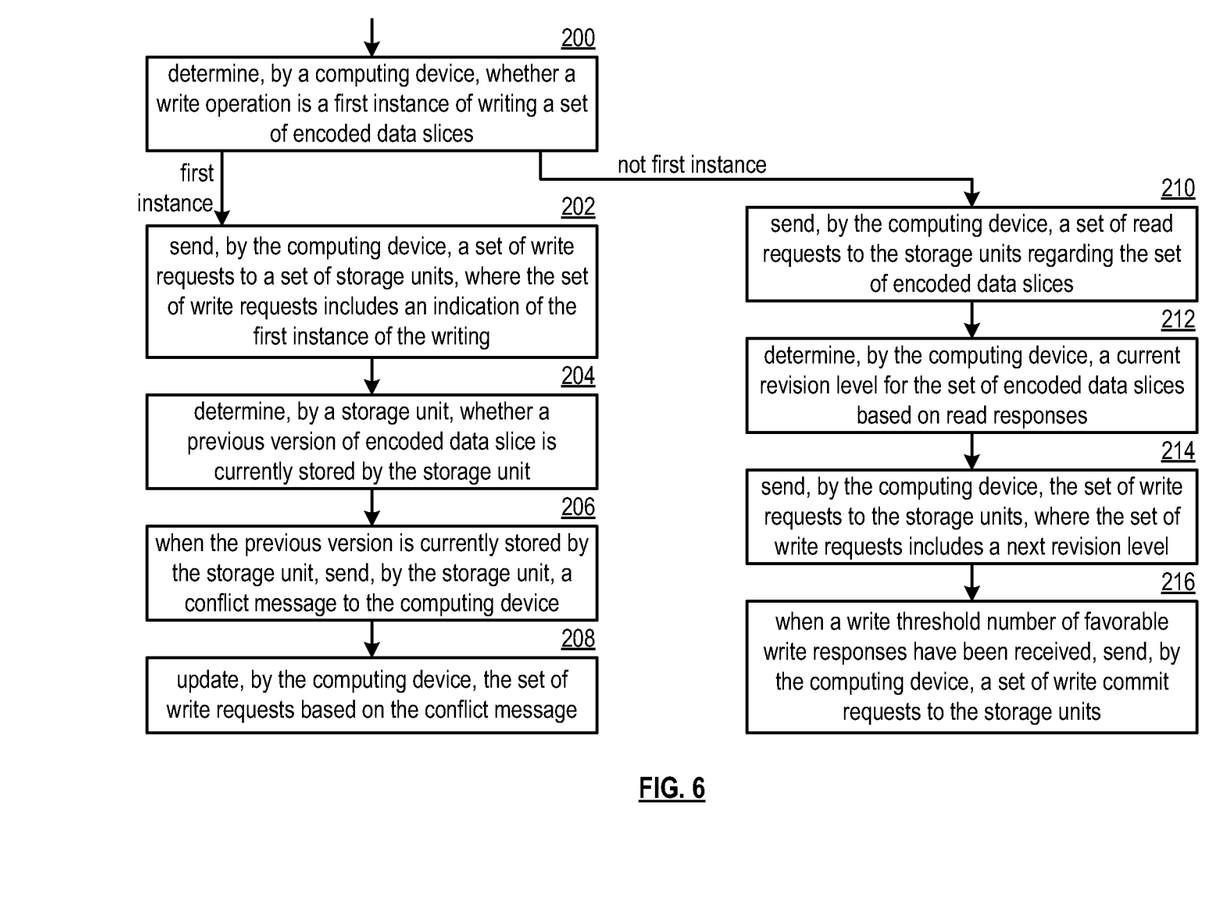
FIG. 6 is a flowchart illustrating an example of storing data in accordance with the present invention.

FIG. 6 is a flowchart illustrating an example of storing data. In particular, a method is presented for use in conjunction with one or more functions and features described in conjunction with FIGS. 1-2, 3-5, and also FIG. 6. The method begins at step 200 where a computing device of one or more computing devices of a dispersed storage network (DSN), for a write operation regarding a set of encoded data slices to be written to storage units of the DSN, determines whether the write operation is a first instance of writing the set of encoded data slices, where a data segment of a data object is dispersed storage error encoded into the set of encoded data slices. The determining may be based on one or more of detecting that the write operation is associated with a new virtual storage vault, detecting that a virtual DSN address associated with the data object has been recently randomly generated, detecting that the data object is substantially new data, detecting that storage vault is substantially empty, interpreting a historical access record that indicates that instances of writing new data far outnumbers instances of overwriting previously stored data, a predetermination, and a pattern associated with performing new write operations. The method branches to step 210 when the computing device determines that the write operation is not the first instance of the writing. The method continues to step 202 when the computing device determines that the write operation is the first instance of the writing.

When the write operation is the first instance of the writing the set of encoded data slices, the method continues at step 202 where the computing device sends a set of write requests to the storage units, where the set of write requests includes the set of encoded data slices, a set of slice names, and an indication of the first instance of the writing of the set of encoded data slices. The indication of the first instance of the writing of the set of encoded data slices includes one of providing, within each write request of the set of write requests, a revision level of zero and omitting, within each write request of the set of write requests, a revision level indication.

In response to a write request of the set of write requests, the method continues at step 204 where a storage unit of the set of storage units determines whether a previous version of an encoded data slice of the set of encoded data slices is currently stored by the storage unit. In response to another write request of the set of write requests, another storage unit of the set of storage units determines whether a previous version of another encoded data slice of the set of encoded data slices is currently stored by the other storage unit.

When the previous version of an encoded data slice of the set of encoded data slices is currently stored by the storage unit, the method continues at step 206 where the storage unit sends a conflict message to the computing device. When the other encoded data slice is stored by the other storage unit, the other storage unit sends another conflict message indicating that the other storage unit is storing a previous version of the other encoded data slice.

The method continues at step 208 where the computing device updates the set of write requests based on the conflict message. The updating includes the computing device determining a current revision level for the set of encoded data slices based on the conflict message from one or more of the storage units, updating the set of write requests to include a next revision level for the set of encoded data slices, and sending the updated set of write requests to the storage units, where the updated set of write requests includes the set of encoded data slices, the set of slice names, and the next revision level for the set of encoded data slices.

Alternatively, when the write operation is the first instance of writing the set of encoded data slices the computing device receives favorable write responses from at least some of the storage units and when a write threshold number of the favorable write responses have been received, the computing device sends a set of write commit requests to the storage units.

When the write operation is not the first instance of writing the set of encoded data slices, the method continues at step 210 where the computing device sends a set of read requests to the storage units regarding the set of encoded data slices. The method continues at step 212 where the computing device determine a current revision level for the set of encoded data slices based on read responses from at least some of the storage units (e.g., a next revision level). The method continues at step 214 where the computing device sends the set of write requests to the storage units, where the set of write requests includes the set of encoded data slices, the set of slice names, and the next revision level for the set of encoded data slices. When a write threshold number of the favorable write responses have been received, the method continues at step 216 where the computing device sends a set of write commit requests to the storage units.

The method described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium and/or computer readable memory device) that stores operational instructions can, when executed by one or more processing modules of one or more computing devices and/or by the storage units of the dispersed storage network (DSN), cause the one or more computing devices and/or the storage units to perform any or all of the method steps described above.

Figure 7:
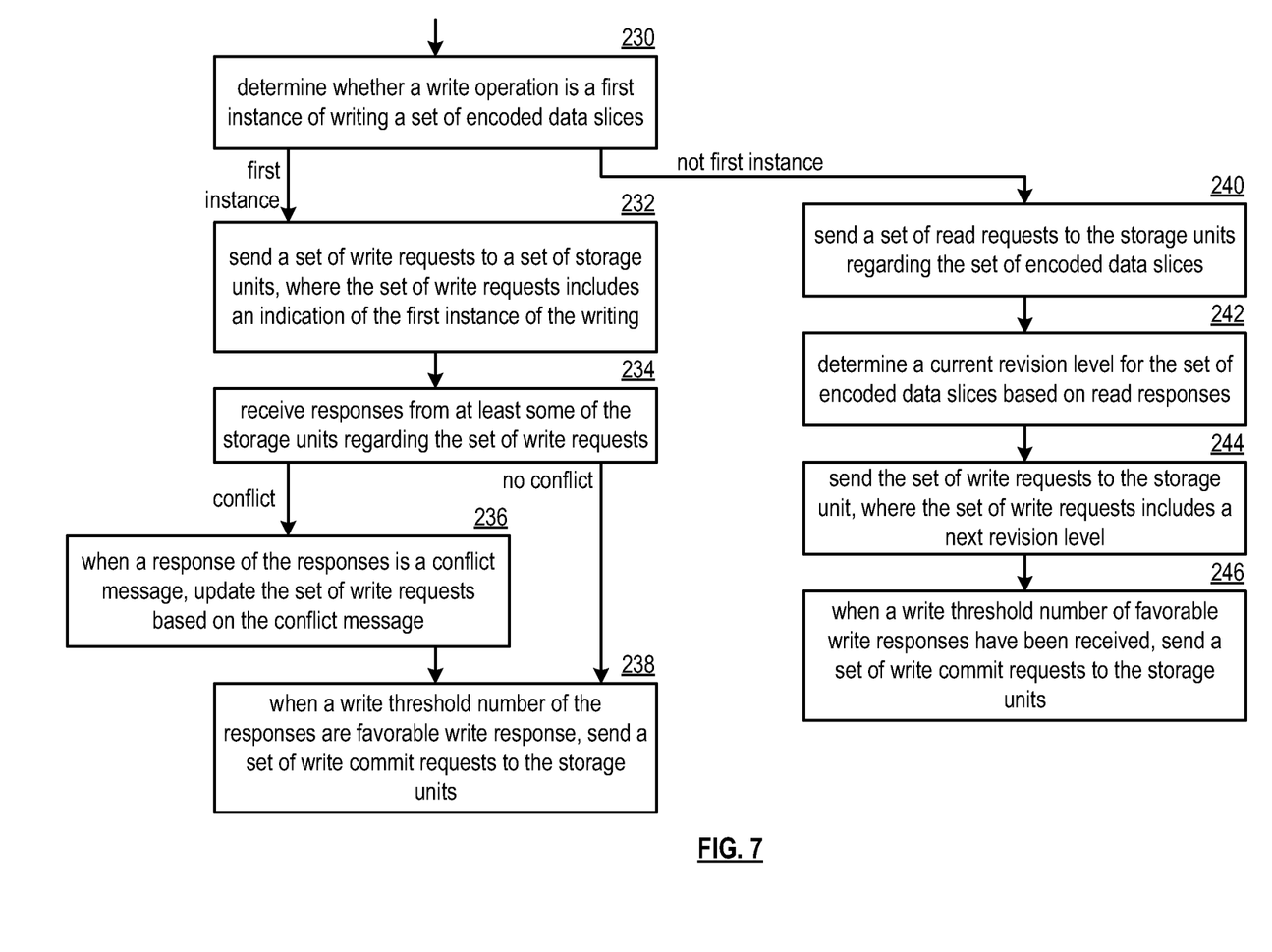
FIG. 7 is a flowchart illustrating another example of storing data in accordance with the present invention.

FIG. 7 is a flowchart illustrating another example of storing data. In particular, a method is presented for use in conjunction with one or more functions and features described in conjunction with FIGS. 1-2, 3-5, and also FIG. 7. The method begins at step 230 where a processing module of a computing device of one or more computing devices of a dispersed storage network (DSN), for a write operation regarding a set of encoded data slices to be written to storage units of the DSN, determines whether the write operation is a first instance of writing the set of encoded data slices, where a data segment of a data object is dispersed storage error encoded into the set of encoded data slices. The method branches to step 240 when the write operation is not the first instance of writing the set of encoded data slices. The method continues to step 232 when the write operation is the first instance.

When the write operation is the first instance of writing the set of encoded data slices, the method continues at step 232 where the processing module sends a set of write requests to the storage units, where the set of write requests includes the set of encoded data slices, a set of slice names, and an indication of the first instance of the writing of the set of encoded data slices. The method continues at step 234 where the processing module receives responses from at least some of the storage unit regarding the set of write requests. When none of the responses includes a conflict message, the method branches to step 238. When at least one response includes the conflict message, the method continues to step 236.

When a response of the responses is the conflict message, the method continues at step 236 where the processing module updates the set of write requests based on the conflict message, where the conflict message indicates that a previous version of at least one encoded data slices of the set of encoded data slices is stored by a storage unit of the set of storage units. The updating the set of write requests includes the processing module determining a current revision level for the set of encoded data slices based on the conflict message from one or more of the storage units, updating the set of write requests to include a next revision level for the set of encoded data slices, and sending the updated set of write requests to the storage units, where the updated set of write requests includes the set of encoded data slices, the set of slice names, and the next revision level for the set of encoded data slices. When none of the responses includes the conflict message and when a write threshold number of the responses are favorable write responses, the method continues at step 238 where the processing module sends a set of write commit requests to the storage units.

When the write operation is not the first instance of writing the set of encoded data slices, the method continues at step 240 where the processing module sends a set of read requests to the storage units regarding the set of encoded data slices. Alternatively, the processing module sends a set of list requests to the storage units regarding the slice names of the set of encoded data slices. The method continues at step 242 where the processing module determines a current revision level for the set of encoded data slices based on read responses (e.g., or alternatively, from list responses) from at least some of the storage units.

The method continues at step 244 where the processing module sends the set of write requests to the storage units, where the set of write requests includes the set of encoded data slices, the set of slice names, and a next revision level for the set of encoded data slices. When a write threshold number of the favorable write responses have been received, the method continues at step 246 where the processing module sends a set of write commit requests to the storage units.

The method described above in conjunction with the processing module can alternatively be performed by other modules of the dispersed storage network or by other devices. For example, any combination of a first module, a second module, a third module, a fourth module, etc., of the processing module performs the method described above. In addition, at least one memory section (e.g., a first memory section, a second memory section, a third memory section, a fourth memory section, a fifth memory section, a sixth memory section, etc. of a non-transitory computer readable storage medium and/or computer readable memory device) that stores operational instructions can, when executed by one or more processing modules of the dispersed storage network (DSN), cause the one or more computing devices to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:
for a write operation regarding a set of encoded data slices to be written to storage units of a dispersed storage network (DSN), determining, by a computing device, whether the write operation is a first instance of writing the set of encoded data slices without determining a current revision level of the set of encoded data slices, wherein a data segment of a data object is dispersed storage error encoded into the set of encoded data slices, and wherein the determining includes one or more of detecting that the write operation is associated with a new virtual storage vault, detecting that a virtual DSN address associated with the data object has been recently randomly generated, detecting that the data object is substantially new data, detecting that the virtual storage vault is substantially empty, interpreting a historical access record that indicates that instances of writing new data far outnumbers instances of overwriting previously stored data, a predetermination, and a pattern associated with performing new write operations;
when the write operation is a first instance of writing the set of encoded data slices, sending, by the computing device, a set of write requests to the storage units, wherein the set of write requests includes the set of encoded data slices, a set of slice names, and an indication of the first instance of the writing of the set of encoded data slices;
in response to a write request of the set of write requests, determining, by a storage unit of the storage units, whether a previous version of an encoded data slice of the set of encoded data slices is currently stored by the storage unit;
when the previous version of an encoded data slice of the set of encoded data slices is currently stored by the storage unit, sending, by the storage unit, a conflict message to the computing device; and
updating, by the computing device, the set of write requests based on the conflict message.

2. The method of claim 1, wherein the indication of the first instance of the writing of the set of encoded data slices comprises one of:
providing, within each write request of the set of write requests, a revision level of zero; and
omitting, within each write request of the set of write requests, a revision level indication.

3. The method of claim 1 further comprises:
when the write operation is not the first instance of writing the set of encoded data slices:

sending, by the computing device, a set of read requests to the storage units regarding the set of encoded data slices;

determining, by the computing device, the current revision level for the set of encoded data slices based on read responses from at least some of the storage units;

sending, by the computing device, the set of write requests to the storage units, wherein the set of write requests includes the set of encoded data slices, the set of slice names, and a next revision level for the set of encoded data slices; and when a write threshold number of favorable write responses have been received, sending, by the computing device, a set of write commit requests to the storage units.

4. The method of claim 1 further comprises:
when the write operation is the first instance of writing the set of encoded data slices:
receiving favorable write responses from at least some of the storage units; and
when a write threshold number of the favorable write responses have been received, sending, by the computing device, a set of write commit requests to the storage units.

5. The method of claim 1, wherein the updating the set of write requests comprises:
determining, by the computing device, the current revision level for the set of encoded data slices based on the conflict message from one or more of the storage units;
updating, by the computing device, the set of write requests to include a next revision level for the set of encoded data slices; and
sending, by the computing device, the updated set of write requests to the storage units, wherein the updated set of write requests includes the set of encoded data slices, the set of slice names, and the next revision level for the set of encoded data slices.

6. The method of claim 1 further comprises:
in response to another write request of the set of write requests, determining, by another storage unit of the storage units, whether a previous version of another encoded data slice of the set of encoded data slices is currently stored by the other storage unit; and
when the other encoded data slice is stored by the other storage unit, sending, by the other storage unit, another conflict message indicating that the other storage unit is storing a previous version of the other encoded data slice.

7. A method execution by a computing device of a dispersed storage network (DSN), the method comprises:
for a write operation regarding a set of encoded data slices to be written to storage units of the DSN, determining whether the write operation is a first instance of writing the set of encoded data slices without determining a current revision level of the set of encoded data slices, wherein a data segment of a data object is dispersed storage error encoded into the set of encoded data slices;
when the write operation is a first instance of writing the set of encoded data slices, sending a set of write requests to the storage units, wherein the set of write requests includes the set of encoded data slices, a set of slice names, and an indication of the first instance of the writing of the set of encoded data slices;
receiving responses from at least some of the storage unit regarding the set of write requests;

when a response of the responses is a conflict message, updating the set of write requests based on the conflict message, wherein the conflict message indicates that a previous version of at least one encoded data slices of the set of encoded data slices is stored by a storage unit of the storage units; and when a write threshold number of the responses are favorable write responses, sending a set of write commit requests to the storage units.

8. The method of claim 7, wherein the updating the set of write requests comprises:
determining the current revision level for the set of encoded data slices based on the conflict message from one or more of the storage units;
updating the set of write requests to include a next revision level for the set of encoded data slices; and
sending the updated set of write requests to the storage units, wherein the updated set of write requests includes the set of encoded data slices, the set of slice names, and the next revision level for the set of encoded data slices.

9. The method of claim 7, wherein the indication of the first instance of the writing of the set of encoded data slices comprises one of:
providing, within each write request of the set of write requests, a revision level of zero; and
omitting, within each write request of the set of write requests, a revision level indication.

10. The method of claim 7 further comprises:
when the write operation is not the first instance of writing the set of encoded data slices:
sending a set of read requests to the storage units regarding the set of encoded data slices;
determining the current revision level for the set of encoded data slices based on read responses from at least some of the storage units;
sending the set of write requests to the storage units, wherein the set of write requests includes the set of encoded data slices, the set of slice names, and a next revision level for the set of encoded data slices; and
when a write threshold number of the favorable write responses have been received, sending a set of write commit requests to the storage units.

11. A storage system comprises:
a first module that, when operable within a computing device of a dispersed storage network (DSN), causes the computing device to:
for a write operation regarding a set of encoded data slices to be written to storage units of the DSN, determine whether the write operation is a first instance of writing the set of encoded data slices without determining a current revision level of the set of encoded data slices, wherein a data segment of a data object is dispersed storage error encoded into the set of encoded data slices, and wherein the determining includes one or more of detecting that the write operation is associated with a new virtual storage vault, detecting that a virtual DSN address associated with the data object has been recently randomly generated, detecting that the data object is substantially new data, detecting that the virtual storage vault is substantially empty, interpreting a historical access record that indicates that instances of writing new data far outnumbers instances of overwriting previously stored data, and a pattern associated with performing new write operations;

when the write operation is a first instance of writing the set of encoded data slices, send a set of write requests to the storage units, wherein the set of write requests includes the set of encoded data slices, a set of slice names, and an indication of the first instance of the writing of the set of encoded data slices;

a second module that, when operable within a storage unit of the storage units, causes the storage unit to:

in response to a write request of the set of write requests, determine whether a previous version of an encoded data slice of the set of encoded data slices is currently stored by the storage unit; and when the previous version of an encoded data slice of the set of encoded data slices is currently stored by the storage unit, send a conflict message to the computing device; and a third module that, when operable within the computing device, causes the computing device to:

update the set of write requests based on the conflict message.

12. The storage system of claim 11, wherein the indication of the first instance of the writing of the set of encoded data slices comprises one of:

providing, within each write request of the set of write requests, a revision level of zero; and omitting, within each write request of the set of write requests, a revision level indication.

13. The storage system of claim 11 further comprises:

a fourth module that, when operable within the computing device, causes the computing device to:

when the write operation is not the first instance of writing the set of encoded data slices:

send a set of read requests to the storage units regarding the set of encoded data slices;

determine the current revision level for the set of encoded data slices based on read responses from at least some of the storage units;

send the set of write requests to the storage units, wherein the set of write requests includes the set of encoded data slices, the set of slice names, and a next revision level for the set of encoded data slices; and when a write threshold number of favorable write responses have been received, send a set of write commit requests to the storage units.

14. The storage system of claim 11, wherein the first module that, when operable within the computing device, further causes the computing device to:

when the write operation is the first instance of writing the set of encoded data slices:

receive favorable write responses from at least some of the storage units; and when a write threshold number of the favorable write responses have been received, send a set of write commit requests to the storage units.

15. The storage system of claim 11, wherein the first module that, when operable within the computing device, further causes the computing device to update the set of write requests by:

determining the current revision level for the set of encoded data slices based on the conflict message from one or more of the storage units;

updating the set of write requests to include a next revision level for the set of encoded data slices; and sending the updated set of write requests to the storage units, wherein the updated set of write requests includes the set of encoded data slices, the set of slice names, and the next revision level for the set of encoded data slices.

16. The storage system of claim 11 further comprises:

a fourth module that, when operable within another storage unit of the storage units, causes the other storage unit to:

in response to another write request of the set of write requests, determine whether a previous version of another encoded data slice of the set of encoded data slices is currently stored by the other storage unit; and when the other encoded data slice is stored by the other storage unit, send another conflict message indicating that the other storage unit is storing a previous version of the other encoded data slice.

17. A computer readable memory device comprises:

a first memory section that stores operational instructions that, when executed by a computing device of a dispersed storage network (DSN), causes the computing device to:

for a write operation regarding a set of encoded data slices to be written to storage units of the DSN, determine whether the write operation is a first instance of writing the set of encoded data slices without determining a current revision level of the set of encoded data slices, wherein a data segment of a data object is dispersed storage error encoded into the set of encoded data slices, and wherein the determining includes one or more of detecting that the write operation is associated with a new virtual storage vault, detecting that a virtual DSN address associated with the data object has been recently randomly generated, detecting that the data object is substantially new data, detecting that the virtual storage vault is substantially empty, interpreting a historical access record that indicates that instances of writing new data far outnumbers instances of overwriting previously stored data, a predetermination, and a pattern associated with performing new write operations;

a second memory section that stores operational instructions that, when executed by the computing device, causes the computing device to:

when the write operation is a first instance of writing the set of encoded data slices, send a set of write requests to the storage units, wherein the set of write requests includes the set of encoded data slices, a set of slice names, and an indication of the first instance of the writing of the set of encoded data slices;

a third memory section that stores operational instructions that, when executed by the computing device, causes the computing device to:

receive responses from at least some of the storage unit regarding the set of write requests;

a fourth memory section that stores operational instructions that, when executed by the computing device, causes the computing device to:

when a response of the responses is a conflict message, update the set of write requests based on the conflict message, wherein the conflict message indicates that a previous version of at least one encoded data slices of the set of encoded data slices is stored by a storage unit of the set of storage units; and a fifth memory section that stores operational instructions that, when executed by the computing device, causes the computing device to:

when a write threshold number of the responses are favorable write responses, send a set of write commit requests to the storage units.

18. The computer readable memory device of claim 17, wherein the updating the set of write requests comprises:
   determining the current revision level for the set of encoded data slices based on the conflict message from one or more of the storage units;
   updating the set of write requests to include a next revision level for the set of encoded data slices; and
   sending the updated set of write requests to the storage units, wherein the updated set of write requests includes the set of encoded data slices, the set of slice names, and the next revision level for the set of encoded data slices.

19. The computer readable memory device of claim 17, wherein the indication of the first instance of the writing of the set of encoded data slices comprises one of:
   providing, within each write request of the set of write requests, a revision level of zero; and
   omitting, within each write request of the set of write requests, a revision level indication.

20. The computer readable memory device of claim 17 further comprises:
   a sixth memory section that stores operational instructions that, when executed by the computing device, causes the computing device to:
      when the write operation is not the first instance of writing the set of encoded data slices:
         send a set of read requests to the storage units regarding the set of encoded data slices;
         determine the current revision level for the set of encoded data slices based on read responses from at least some of the storage units;
         send the set of write requests to the storage units, wherein the set of write requests includes the set of encoded data slices, the set of slice names, and a next revision level for the set of encoded data slices; and
         when a write threshold number of the favorable write responses have been received, send a set of write commit requests to the storage units.

21. A computing device comprises:
   an interface;
   memory; and
   a processing module operably coupled to the interface and to the memory, wherein the processing module is operable to:
      for a write operation regarding a set of encoded data slices to be written to storage units of a dispersed storage network (DSN), determine whether the write operation is a first instance of writing the set of encoded data slices without determining a current revision level of the set of encoded data slices, wherein a data segment of a data object is dispersed storage error encoded into the set of encoded data slices, and wherein the determining includes one or more of detecting that the write operation is associated with a new virtual storage vault, detecting that a virtual DSN address associated with the data object has been recently randomly generated, detecting that the data object is substantially new data, detecting that the virtual storage vault is substantially empty, interpreting a historical access record that indicates that instances of writing new data far outnumbers instances of overwriting previously stored data, a predetermination, and a pattern associated with performing new write operations;
      when the write operation is a first instance of writing the set of encoded data slices, send, via the interface, a set of write requests to the storage units, wherein the set of write requests includes the set of encoded data slices, a set of slice names, and an indication of the first instance of the writing of the set of encoded data slices;
      receive, via the interface, responses from at least some of the storage unit regarding the set of write requests;
      when a response of the responses is a conflict message, update the set of write requests based on the conflict message, wherein the conflict message indicates that a previous version of at least one encoded data slices of the set of encoded data slices is stored by a storage unit of the set of storage units; and
      when a write threshold number of the responses are favorable write responses, send, via the interface, a set of write commit requests to the storage units.

22. The computing device of claim 21, wherein the processing module is further operable to update the set of write requests by:
   determining the current revision level for the set of encoded data slices based on the conflict message from one or more of the storage units;
   updating the set of write requests to include a next revision level for the set of encoded data slices; and
   sending, via the interface, the updated set of write requests to the storage units, wherein the updated set of write requests includes the set of encoded data slices, the set of slice names, and the next revision level for the set of encoded data slices.

23. The computing device of claim 21, wherein the indication of the first instance of the writing of the set of encoded data slices comprises one of:
   providing, within each write request of the set of write requests, a revision level of zero; and
   omitting, within each write request of the set of write requests, a revision level indication.

24. The computing device of claim 21, wherein the processing module is further operable to:
   when the write operation is not the first instance of writing the set of encoded data slices:
      send, via the interface, a set of read requests to the storage units regarding the set of encoded data slices;
      determine the current revision level for the set of encoded data slices based on read responses from at least some of the storage units;
      send, via the interface, the set of write requests to the storage units, wherein the set of write requests includes the set of encoded data slices, the set of slice names, and a next revision level for the set of encoded data slices; and
      when a write threshold number of the favorable write responses have been received, send, via the interface, a set of write commit requests to the storage units.

25. The computing device of claim 21, wherein the processing module is further operable to:
   when the write threshold number of the responses are conflict messages, update the set of write requests based on the conflict message.

* * * * *